United States Patent [19]
Baughman et al.

[11] Patent Number: 5,111,629
[45] Date of Patent: May 12, 1992

[54] DUAL-PANE THERMAL WINDOW WITH LIQUID CRYSTAL SHADE

[75] Inventors: Ray H. Baughman, Morris Plains; Ernest D. Buff, Far Hills; Helmut Eckhardt, Madison; Gerhard H. Fuchs, Far Hills, all of N.J.

[73] Assignee: Allied-Signal Inc., Morris Township, Morris County, N.J.

[21] Appl. No.: 687,280

[22] Filed: Apr. 18, 1991

Related U.S. Application Data

[62] Division of Ser. No. 597,216, Oct. 15, 1990, Pat. No. 5,025,602, which is a division of Ser. No. 515,034, Apr. 26, 1990, Pat. No. 5,009,044, which is a division of Ser. No. 425,263, Oct. 23, 1989, Pat. No. 4,964,251, which is a division of Ser. No. 398,599, Aug. 25, 1989, Pat. No. 4,899,503, which is a division of Ser. No. 350,808, May 12, 1989, Pat. No. 4,893,902, which is a division of Ser. No. 66,299, Jun. 25, 1987, Pat. No. 4,848,875.

[51] Int. Cl.⁵ .......................... E04C 2/54; G02F 1/133
[52] U.S. Cl. .................................. 52/171; 52/173 R; 52/788
[58] Field of Search .................. 52/171, 172, 173 R, 52/328, 788; 428/34; 350/331 R, 331 T, 339 R, 337, 350 R

[56] References Cited

U.S. PATENT DOCUMENTS 5,009,044  4/1991  Baughman et al. ............... 52/171
5,025,602  6/1991  Baughman et al. ............... 52/171

Primary Examiner—Richard E. Chilcot, Jr.
Attorney, Agent, or Firm—Ernest D. Buff; Gerhard H. Fuchs

[57] ABSTRACT

A dual-pane thermal window unit comprises two non-intersecting or, preferably, substantially parallel, spaced window panes, mounted in a window frame, a first of the panes having affixed thereto a first wall of an electro-optical liquid crystal cell providing a selected light transmittance, and a second of said panes delimiting, with a second wall of said cell, a space providing a thermal break. Each of the first and second walls comprises an electrically conductive film composed of plastic and having sufficient supporting strength to maintain the structural integrity of the cell. The window is light weight, economical to manufacture and efficient and reliable in operation.

21 Claims, 3 Drawing Sheets

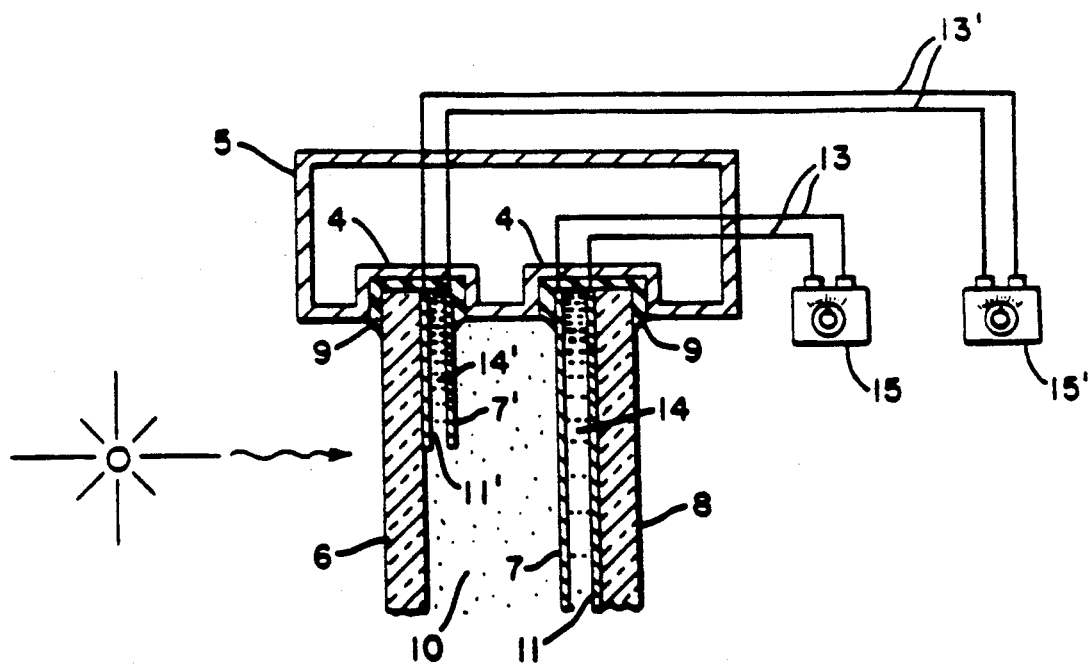
F I G. 3
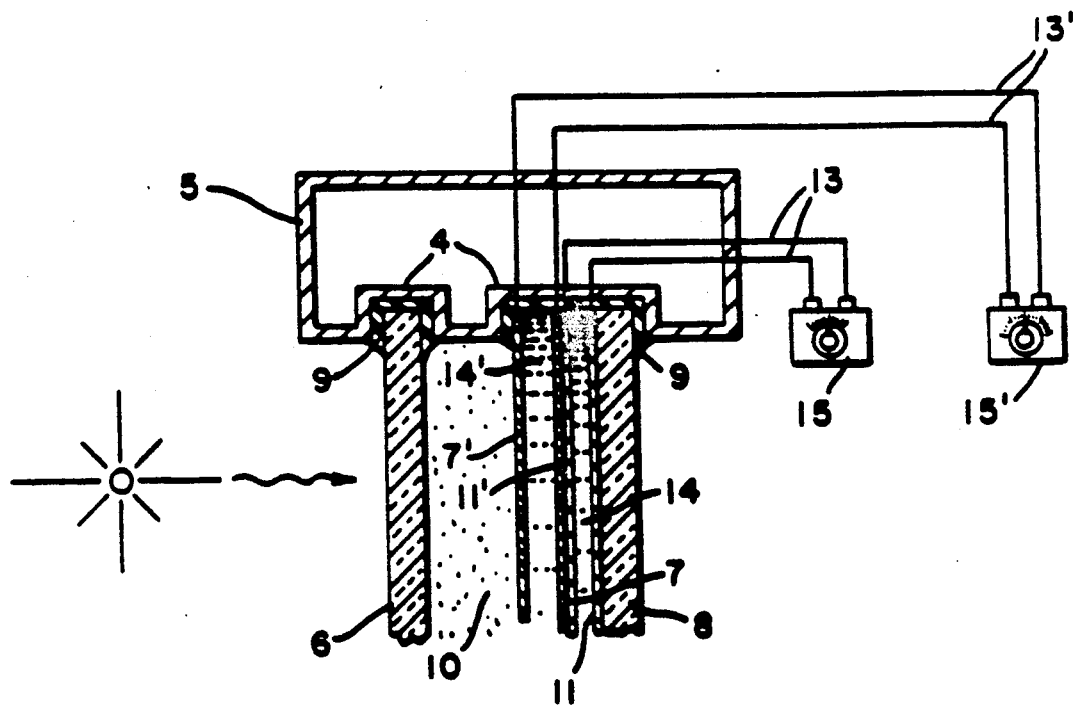
F I G. 4

DUAL-PANE THERMAL WINDOW WITH LIQUID CRYSTAL SHADE

This application is a division of application Ser. No. 597,216, filed Oct. 15, 1990 now U.S. Pat. No. 5,025,602 which in turn is a division of application Ser. No. 515,034, filed Apr. 26, 1990 now U.S. Pat. No. 5,009,044; which in turn is a division of application Ser. No. 425,263 filed Oct. 23, 1989 now U.S. Pat. No. 4,964,251; which in turn is a division of application Ser. No. 398,599 filed Aug. 25, 1989 now U.S. Pat. No. 4,899,503; which in turn is a division of application Ser. No. 350,808 filed May 12, 1989 now U.S. Pat. No. 4,893,902; which in turn is a division of application Ser. No. 66,299 filed June 25, 1987 now U.S. Pat. No. 4,848,875.

BACKGROUND OF THE INVENTION

This invention relates to the use of a liquid crystal material to selectively control light transmission through a transparent or semitransparent panel, and more particularly to the use of a liquid crystal material to provide a window shade of adjustable transmittance, in combination with a dual-pane, heat-insulating window panel (thermal-pane window).

Thermal-pane windows conventionally make use of spaced dual panes to provide a thermal barrier restricting heat conduction between the outside and the inside of a building and therefore tending to reduce heating and cooling costs. To further reduce cooling costs, window shades or blinds are used to block out intense, direct rays of sunlight, since conventional windows, insulating or otherwise, have little effect on radiative heating. However, in using a conventional shade to eliminate solar glare, the view to the outside is blocked, which may be considered a visually unattractive result. U.S. Pat. No. 4,268,126 discloses a three pane window unit that overcomes this limitation without sacrificing energy efficiency by providing an electro-optical shade as an integral part of a thermal pane window. The room occupant may select the degree of light transmittance of the shade, thus eliminating glare and the adverse effect on cooling requirements from direct rays of the sun, while not blocking the view to the outside.

The present invention makes use of liquid crystal material to provide adjustable control of the intensity of light transmission through a multi-pane, thermal window unit. Generally, use of liquid crystal materials to selectively control light transmission through a transparent panel is known. Representative patents disclosing the nature of liquid crystal materials and their use are U.S. Pat. No. 3,322,485 to Williams, entitled "Electro-Optical Elements Utilizing an Organic Nematic Compound", U.S. Pat. No. 4,005,928 to Kmetz, entitled "Nematic Liquid Crystal Displays for Low Voltage Direct Current Operation", and U.S. Pat. Nos. 4,268,126 and 4,456,335 to Mumford entitled "Thermal Pane Window With Liquid Crystal Shade." New applications requiring improved window constructions have necessitated efforts to develop thermal window units that are lighter and more easily fabricated.

SUMMARY OF THE INVENTION

The present invention provides an electro-optical shade of adjustable light transmittance as an integral part of a dual-pane thermal window unit. Advantageously, the window unit is resistant to radiative heating and conductive heat transfer between the exterior and interior of a building. The window unit comprises two nonintersecting and, preferably, substantially parallel, spaced window panes, mounted in a window frame, a first of the panes having affixed thereto a first wall of an electro-optical liquid crystal cell providing a selected light transmittance, and a second of said panes delimiting, with a second wall of said cell, a space providing a thermal break.

The term "electro-optical liquid crystal cell" as used hereinafter is intended to mean a volume of liquid crystal material between two closely spaced electrodes, the liquid crystal material being electro-optically responsive to an applied voltage between the electrodes, such that light transmittance through the liquid crystal material is selectable depending upon the resulting electric field strength, current flow, or change passed through the cell. Additionally, the "electro-optical liquid crystal cell" can contain sealant layers, support layers comprised, in one embodiment of the invention, of a plurality of walls of transparent, electrically conductive film having sufficient supporting strength to maintain the structural integrity of the cell when liquid crystal material is disposed between opposing faces of the walls; binders; polarizer elements; and associated adhesives, as discussed hereinafter in more detail.

As used herein the term "pane" means a transparent or semitransparent, inorganic or organic material having mechanical rigidity and a thickness greater than 1 mm.

The term "electrically conductive film" as used herein means a layer or sequence of layers containing an electrically conductive layer without differentiation of the position of the conductive layer in a sequence of layers. The electrically conductive layer can consist of a conductive film of uniform or of nonuniform thickness or of a sheet-like array of substantially parallel wires.

The window unit may further comprise window frame means for securing the mutual orientation of a plurality of transparent, nonintersecting or, preferably, substantially parallel, sequentially spaced panes and for sealingly isolating a space therebetween; a first transparent pane mounted in the window frame means in a position toward an exterior facing side of said frame means; a second transparent pane, nonintersecting with and, preferably, substantially parallel to and spaced from said first pane, mounted in said frame means in a position toward an interior facing side of said frame means; a liquid crystal cell comprising a first wall composed of transparent, electrically conductive film, a second wall composed of transparent, electrically conductive film and liquid crystal material disposed between opposing faces of said first and second walls, said liquid crystal material being electro-optically responsive and said electrically conductive film having sufficient supporting strength to maintain the integrity of said cell; said first wall of said cell being affixed to one of the opposing faces of said first and second panes and said second wall of said cell delimiting with the other opposing face of said first and second panes a space providing a thermal break; and electrical means for applying an electric field between said conductive films and through said liquid crystal material of a selected field strength at least sufficient to change the optical transmission of said liquid crystal material.

The invention further provides a method for decreasing radiative heating and conductive heat transfer between the exterior and the interior of a building, comprising the steps of: mounting within a window frame a plurality of spaced window panes, a first and second of said panes having opposing faces; affixing to one of the opposing faces a first wall of a liquid crystal cell, said first wall being composed of transparent, electrically conductive film and cooperating with a second wall composed of transparent electrically conductive film to form a cavity containing an electro-optically responsive liquid crystal material providing a selected light transmittance; and delimiting between said second wall of said cell and the other of said opposing faces of said panes a space providing a thermal break.

Advantageous structural features are provided by the method and means of this invention. The liquid crystal cell is readily produced as film on rolls for application to the sizeable area provided by either opposing face of the panes. Once applied, a thermal break is achieved without need for more than two panes of glass. The size, weight and cost of the window unit is markedly reduced, manufacturing procedures are simplified and the reliability and operating efficiency of the unit are increased.

The liquid crystal material may be selected as one being electro-optically responsive over a substantially full range of transmittance to an AC or DC field which is preferably at low voltage to minimize the risk of shock hazard in the event of breakage or electrical malfunction.

The panes may be light polarizing to further reduce glare from direct sunlight or to increase the efficiency of the electro-optical liquid crystal cell. An inert gas may be injected into the space delimited between the second wall of the cell and an opposing face of a pane, or the space may be evacuated to the extent practical to enhance thermal conductivity break characteristics.

BRIEF DESCRIPTION OF THE DRAWINGS

The invention will be more fully understood and further advantages will become apparent when reference is made to the following detailed description of the preferred embodiment of the invention and the accompanying drawings in which:

FIG. 3 is a sectional view showing an alternative embodiment in which a wall of the liquid crystal cell is attached to a fractional portion of an opposing face of a pane;

FIG. 4 is a sectional view showing another embodiment wherein plural liquid crystal cells are employed, a first of said cells being attached to one of the opposing faces of a pane and to a wall of a second of said cells;

DESCRIPTION OF THE PREFERRED EMBODIMENTS

Figure 1:
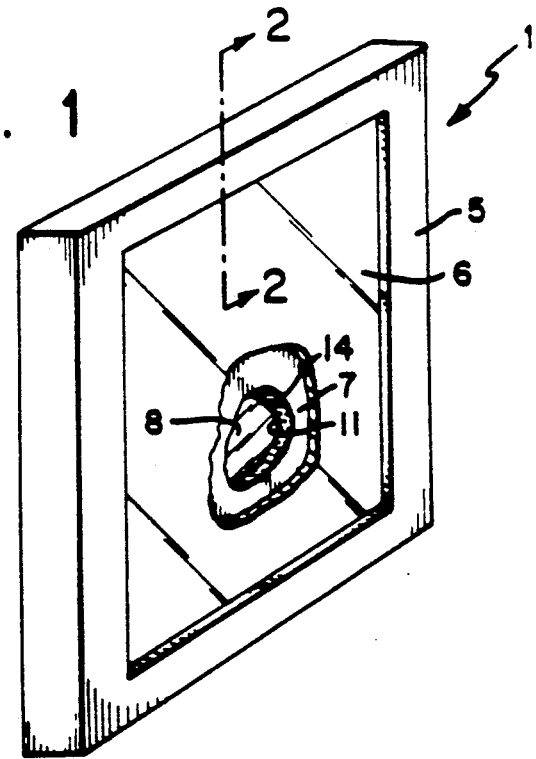
FIG. 1 is a perspective view of a dual paned window of the present invention in a typical frame.
Figure 2:
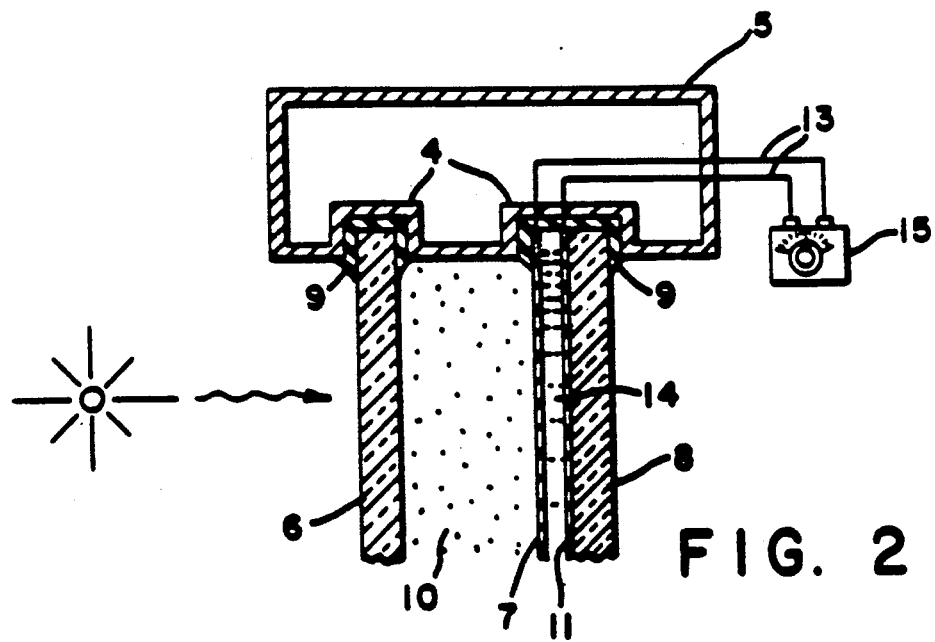
FIG. 2 is a cross-sectional view taken along line 2—2 of FIG. 1, showing a thermal barrier space between a wall of the liquid crystal cell and an opposing face of a pane.

Referring specifically to the drawings, in FIG. 1 there is shown a window unit 1 having two non-intersecting and, preferably, substantially parallel, spaced transparent panes 6 and 8 mounted in a conventional frame 5. A cross-sectional view taken along the line 2—2 in the direction indicated by the arrows is shown in FIG. 2.

Transparent panes 6 and 8 are mounted in channels 4 of frame 5 with a conventional semi-rigid sealant 9, such as butyl rubber, so that the panes are nonintersecting and, preferably substantially parallel and spaced. The sealant aids in securing the mutual orientation of the panes and seals or isolates the space between the panes. The window unit is mounted in a window opening of a wall structure so that pane 6 is the outside pane and pane 8 is the inside pane. Panes 6 and 8 and the space 10 constitute the thermal-pane portion of the embodiment wherein space 10 provides a thermal barrier significantly restricting the conduction of heat through the window. Frame 5 is shown as being hollow, by way of example, to restrict peripheral heat conduction and may be an extruded aluminum alloy. To enhance the thermal barrier effect, space 10 may be evacuated to the extend practical, or filled with an inert gas selected from the group consisting of argon, nitrogen, dry air neon and mixtures thereof. Use of an inert gas, such as nitrogen, inside of the thermal pane can be usefully employed to prevent oxidative degradation of the liquid crystal, polarizer elements, and adhesive layer. Often inert gases, such as argon or neon can also be employed, but are less preferred from a cost viewpoint than nitrogen.

Affixed to one of the opposing faces of panes 6 and 8 by means of a suitable adhesive is a first wall 11 of a liquid crystal cell. A variety of adhesives can be conveniently utilized. Preferably the adhesive should thoroughly wet the surface of the film sandwich, so as to ensure proper bonding and the elimination of spurious void spaces which can scatter light and interfere with sound mechanical adhesion. Also, the set adhesive is preferably colorless and either amorphous or microcrystalline with a crystallite size much smaller than the wavelength of light, so that negligible light scattering or absorption of light occurs at the adhesive interface. Adhesives found especially suitable for this purpose are certain polyvinylacetate adhesives, or cyanoacrylate adhesives and the like. Wall 11 is composed of a transparent, electrically conductive film, such as tin oxide deposited on a transparent film composed of plastic such as polymethylmethacrylate, polycarbonates and the like, and cooperates with a second wall 7 composed of transparent, electrically conductive film having the composition of wall 11 to form a cavity containing a liquid crystal material 14. Electrical leads 13 connect the first and second walls 11 and 7 (which constitute electrodes) to a variable voltage supply 15. Liquid crystal material 14 fills substantially the entire volume of the cavity. Typically, the distance between opposing faces of walls 11 and 7 is about 1 mill.

Electro-optical liquid crystal cells of the type described herein can be conveniently fabricated by a variety of techniques known in the art. For example, the cell can consist of two plastic sheet electrodes made conductive by means of a tin oxide coating, separated by a melt or solution-formed microdispersion of liquid crystal material, the preparation of which is described by P. S. Drzaie, "Polymer Dispersed Nematic Liquid Crystal For Large Area Displays and Light Valves", J. Appl. Phys. 60(6) Sept. 15, 1986. Alternately, one electrode of the electro-optical liquid crystal cells can result from a conductive coating, such as tin oxide, applied to a glass pane. This conducting glass pane can then be coated by the above-described microdispersion of liquid crystals in plastic binder which is then covered with a conductive plastic sheet to complete the cell. Generally, the liquid crystal need not be included in a microdispersion but can rather be deposited as a distinct layer between each of the above-described electro elements, as described in "Topics in Applied Physics", Vol. 40, "Display Devices", edited by J. I. Pankove, Springer-Verlag, New York (1980). That is to say, the liquid crystal material can be deposited between walls 7 and 11 of transparent electrically conductive plastic film, which walls have sufficient supporting strength to maintain the integrity of the cell during installation and operation of the window unit as described hereinafter in more detail.

The nature of liquid crystal materials may be summarized as follows: The three common states of matter are the solid, liquid, and gas states in which the randomness of geometrical arrangement of the molecules increases from the solid to the liquid to the gas. The gas and the ordinary liquid are both isotropic, having the same physical properties in all directions. Most solids are found to be crystalline; that is, their molecular units are arranged in a regular repeating geometrical pattern of lattice units and consequently are frequently anisotropic in that their physical properties vary depending upon the direction of measurement with respect to different crystal axes. Certain organic solid compounds exhibit a peculiar behavior such that upon melting a turbid melt results that changes abruptly to clear isotropic liquid upon heating to a higher temperature. In this temperature range, these compounds are anisotropic with respect to transmission of light. Thus, the characteristics of these compounds are partly those of the isotropic liquid since they exhibit liquid flow and partly those of the anisotropic solid. Therefore, these materials are often called "liquid crystals" or, more accurately, "crystalline liquids" and are sometimes classified as a fourth state of matter referred to as the mesomorphic state or mesophase, being a state or phase intermediate that of the anisotropic crystal and that of the isotropic liquid. There are essentially two major classes of liquid crystals, the "nematic" state and the "smectic" state. The nematic liquid crystal materials generally consist of rod-shaped molecules that tend to align parallel to a common direction resulting in anisotropy for many of the bulk properties. When the alignment is uniform, the sample is optically clear. However, when a critical voltage is applied (typically 2 to 20 volts per mil) to the liquid crystal film, a critical current flow disrupts the uniform alignment causing scattering or refraction of incident light, termed dynamic scattering. As a consequence of this scattering, the light intensity transmitted through the liquid crystal cell decreases. The smectic state is a more highly ordered state than the nematic state. The smectic state does not exhibit dynamic scattering in response to an electric field. On the other hand, smectic materials are desirable in that they exhibit a very low crystal-to-mesomorphic transition temperature and often exist in a mesomorphic state at room temperatures. However, mixtures of smectic and nematic materials may be produced which are effective in dynamic scattering at room temperatures. Further, mixtures of crystalline liquids, such as cholesteric liquid crystals and the like, can be used for purposes of tint or coloration. An ordinary nematic liquid crystal or smectic C phase can be converted into a cholesteric by adding an optically active compound.

Liquid crystalline materials can be used in several different modes to effectively control the transmission of light. These modes utilize: (1) dynamic light scattering from the turbulent flow of liquid crystals in an applied electric field, (2) the development of changed birefringence and resulting changes in rotation of light polarization as a consequence of the application of an electric field, or (3) changes in light absorption as a consequence of the application of an electric field. In the first application mode, the window material assumes a white, hazy appearance as a consequence of the applied field. In the second application mode, where the rotation of light due to optical birefringence is utilized, the liquid crystal is sandwiched between two optically polarizing films. These films are crossed with respect to the polarization of light which is transmitted. Then the development of a changed birefringence of the liquid crystalline layer (as a result of the application of an electric field) changes the rotation angle of the plane of polarization of light in the layer, so that light transmission occurs through the liquid crystal-polarizer ensemble. Alternately, the design changes known in the art permit operation in a mode where light transmission through two polarizers decreases when voltage is applied. In the third general type of application mode, the effect of applied electric field is to change the absorption characteristics of the liquid crystal layer. This can be done in several different ways. First, the liquid crystal layer can be composed of a cholesteric liquid crystal. The light absorption characteristics of such layers depends upon the pitch of the helical structure of the molecular arrays, which is changed by the application of an electric field. Alternately, in a second embodiment, the change in absorption properties of the liquid crystal upon the application of an electric field results from the orientation of monomeric or polymeric dye molecules which are incorporated in the liquid crystal phase. The requirements for these dye molecules are (1) that they must be dichroic, that is to say, they must selectively absorb light only of a specified polarization relative to the molecular axes, (2) that they intimately mix in the liquid crystal, and (3) that they have sufficiently anisotropic shape that this intimate mixing results in preferential orientation of the dye molecules with respect to the oriented liquid crystal film. A detailed discussion of liquid crystal shutters is set forth in chapter 4 of "Topics in Applied Physics", Supra, pp. 151-180.

The voltage supply to the electrodes of the present invention is preferably taken from ordinary AC household supply for purposes of simplicity. Further, it is preferred to reduce the voltage by a transformer to a voltage less than about 15 to 20 volts to minimize the risk of shock hazard to the user in the event of breakage or malfunction. Depending upon the choice of designs for the liquid crystal cell, rectification of this AC voltage might be necessary for cell operation. A fuse may be inserted on the secondary side of the transformer as an additional safety feature. The transformer is adjustable from zero volts up to the voltage in the particular liquid crystal material where minimum transmittance (or maximum transmittance, for inverted operation modes) is achieved, preferably less than roughly 20 volts. Alternatively, if the particular liquid crystal material is responsive to a low voltage DC supply, then the control unit may be battery powered.

Various liquid crystal materials are commercially available, and therefore it is not the intent to limit the present invention to the use of any particular one so long as certain general requirements are met. The liquid crystal material should have an operating temperature range at least coextensive with the range of temperature usually experienced in a habitable building allowing for temperature extremes near windows. The liquid crystal material should be colorless for purposes of appearance of the window unit. Alternatively, mixtures of liquid crystal materials such as spontaneously twisted nematics and cholesteric liquid crystal substances, may be used to change the color of the shade for purposes of tinting or for decorative poses. The liquid crystal material should preferably be responsive to a low voltage AC power supply (either with or without rectification to DC). For illustrative purposes only, examples of liquid crystal materials generally meeting these requirements are shown in the above cited U.S. patents and are hereby incorporated by reference. Further examples are shown in U.S. Pat. Nos. 3,829,491 and 3,809,656, the teachings of which are hereby incorporated by reference thereto, wherein one such representative nematic material is N-(p-methoxybenzylidene)-p-n-butyl aniline. Other liquid crystal materials which have been found suitable for this purpose are side-chain liquid crystal polymers such as those described in Chapter 2 of "Polymeric Liquid Crystals", edited by A. Cifferri et al, Academic Press, New York, (1982) and in G. W. Gray et al, "Smectic Liquid Crystals", Leonard Hill, London, (1984). The Gray et al publication also provides key references for discotic phase liquid crystals, consisting of flat disc-shaped molecules, which can also be employed as the liquid crystal elements of the present electro-optical cells.

In use, the window unit 1 may be mounted in hinged and thermally sealed fashion over the inside of an existing window. The window unit is preferably placed so that the thermal barrier (pane 6) is towards the outside and (pane 8) to which the cell containing liquid crystal material is affixed is towards the inside. Since many of the liquid crystal compositions and optical polarizer elements degrade upon exposure to ultraviolet light found in the solar spectrum and since glass is a good absorber of ultraviolet light, incorporation of the liquid crystal element on the building interior inside of a glass pane is preferred. Also, such incorporation protects the liquid crystal film and associated electrical, adhesive, and optical elements from the effects of weathering. The incorporation of the shutter element (liquid crystal film and associated electrical, adhesive, and optical elements) on the building-interior side of the thermal pane has the advantage of protecting this element from temperature extremes and the effects of extreme temperature cycling. Incorporation of the shutter element inside the thermal pane has the additional advantage of protecting this element from mechanical changes during window cleaning (abrasion) and from the damaging effects of ultraviolet light generated by fluorescent lights.

Alternatively, or for new construction, the window unit 1 may be used alone without a conventional window. Thus, the user is afforded in one unit a storm window and an electro-optical shade having variable light transmittance, selectable at the user's option.

Further features of convenience may be added. For automatic operation, an optical sensor may be included in the circuitry so that the opacity of the shade is controlled automatically according to the intensity of light impinging on the outside of the window. Opacity may be further controlled automatically in accordance with the time of day, the outside temperature, or status activity of air conditioning and heating units to provide an integrated climate control within the room. To facilitate maintenance, access conduits and valves may be provided for space 10 for purge and/or refill. To reduce glare particularly when the unit is operated to the full transmittance mode and to reduce opacity requirements of the liquid crystal cell, panes 6 and/or 8 may be light polarizing. Use of a metal oxide coating such as the tin oxide coating applied to the plastic film of walls 11 and 7 additionally serves to reduce transmission of long wavelength, infrared radiation such as that emitted by warm indoor objects. Heat loss due to radiation transmission through the window from interior portions of the building is thereby reduced. The plastic film itself can function as an insulator to further reduce heat loss from the building. A mixture of crystalline liquids may be employed to tint or change the color of the shade. The panes can be nonplanar, as in embodiments used as skylights, wherein the panes are convex. Interpane spacing can be variable. In a further embodiment of the invention, shown in FIG. 3, the shade may be affixed to a fractional portion of one or more opposing faces and, or plural shades may be so affixed, or affixed to substantially the entire surface areas of the opposing faces, or affixed to each other, as shown in FIG. 4, to provide multiple tinting or coloration of panes 6 and/or 8. The fractional portion of a pane to which the shade is affixed can range from 5 to 95 percent and preferably from 40 to 80 percent thereof. The fractional portions of panes 6 and 8 so shaded are typically arranged in a complementary fashion to maximize the area shaded during operation of the window unit in the minimum transmittance mode. Fractional shading of panes 6 and/or 8 may be used to produce multitint or multicolor borders, script, artistic renditions as found in stained glass windows, and the like.

Figure 5:
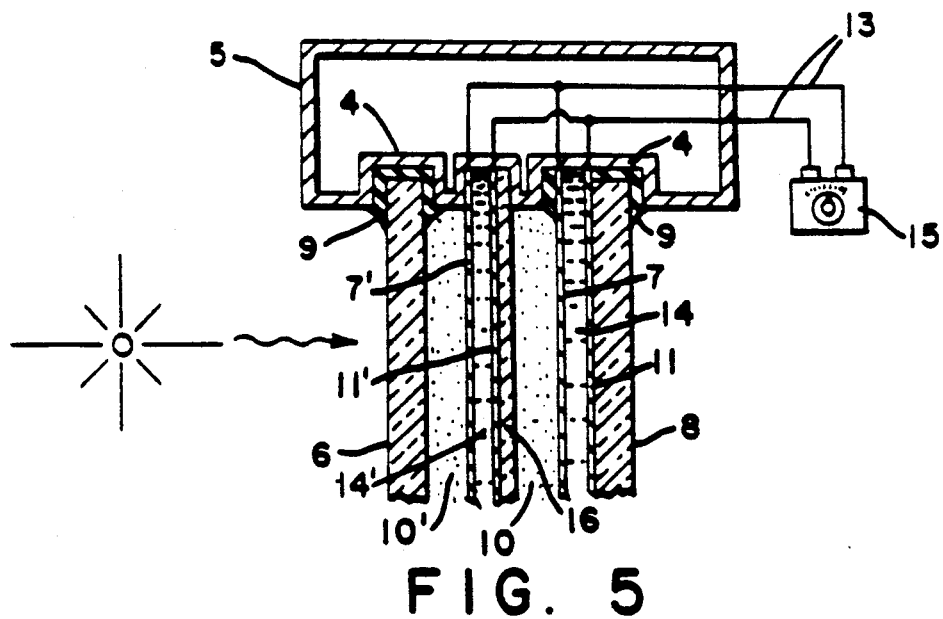
FIG. 5 is a sectional view showing still another embodiment wherein a plurality of panes, a plurality of liquid crystal cells and a plurality of thermal breaks are employed, each of the thermal breaks being delimited between a wall of each of the cells and a face of each of the panes.

In still another embodiment, shown in FIG. 5, the window unit can comprise a plurality of nonintersecting or, preferably, substantially parallel, spaced window panes 6, 8, 16; a plurality of liquid crystal cells 14, 14', each of the cells being affixed to a different one of the panes; and a plurality of thermal breaks 10, 10', each of the thermal breaks being a space delimited between a wall of each of the cells and a face of each of the panes. The number of thermal breaks afforded by this embodiment of the window unit is generally two; one less than the number of panes employed. It will be understood, however, that window unit constructions can be readily produced wherein more than two thermal breaks are achieved, as in the order of up to ten or more thermal breaks per unit. The provision of multiple thermal breaks affords an energy saving feature that renders the unit more cost effective than window units having a single thermal break.

The window panes 6 and/or 8 can be glass or plastic. In constructions of the window unit wherein one or more window panes are plastic, the liquid crystal composition can be included as a microdispersion inside the plastic of the pane. This can be accomplished in several ways. For example, a polymer sheet containing liquid crystal globules can be deposited from an aqueous phase emulsion of a water soluble polymer (such as polyvinyl alcohol), or a colloidal suspension of a water insoluble polymer (i.e., a latex emulsion), or a polymer melt. Alternately, it is possible to microencapsulate the liquid crystal droplets within a molten or solubilized polymer. Thereafter a plastic sheet is produced by conventional melt-forming or solution-forming methods. The resultant plastic sheets containing liquid crystal globules, are then coated on both sides with a transparent electrical conductor such as tin oxide. Such methods for incorporation of liquid crystals into polymer film are described in detail by P. S. Drzaie, "Polymer Dispersed Nematic Liquid Crystal For Large Area Displays and Light Valves", J. Appl. Phys. 60(6) Sept. 15, 1986. Electro-optical liquid crystal cells wherein plastic sheets containing liquid crystal globules are coated on both sides with a transparent electrical conductor such as tin oxide are readily produced using conventional manufacturing procedures and are, for this reason, preferred. Advantageously, with this construction of the pane, the liquid crystal element is protected from damaging effects of oxygen and oxidizing agents found as pollutants in the atmosphere. Polymers considered especially useful for this purpose include polymethylmethacrylate and polycarbonates.

Figure 6:
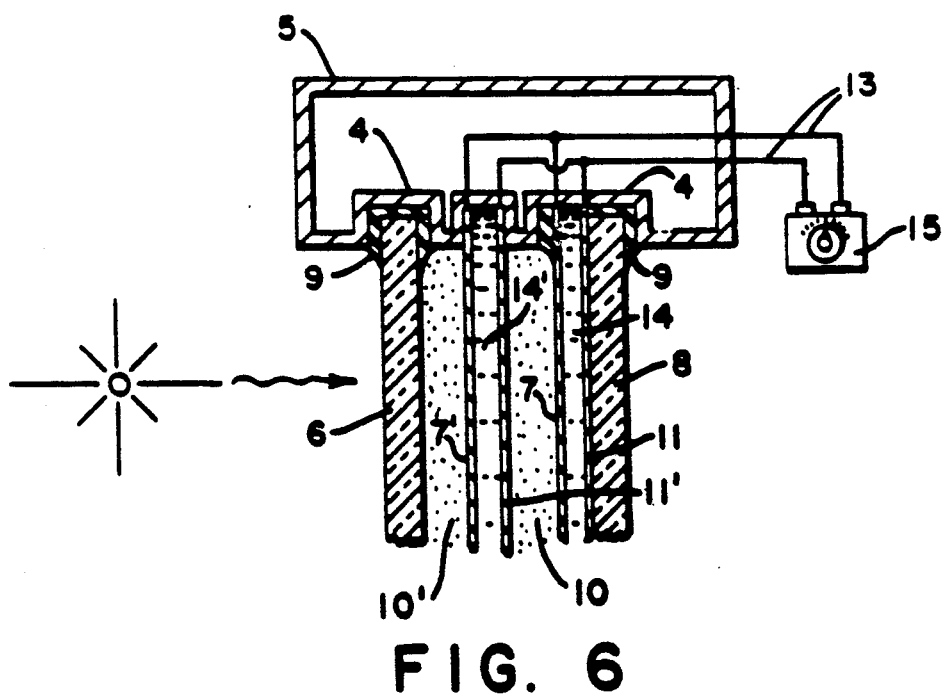
FIG. 6 is a sectional view showing a further embodiment wherein a plurality of liquid crystal cells disposed in spatially separate fashion between two panes provide a plurality of thermal breaks.

It is often advantageous to utilize more than one liquid crystal sheet in the window ensemble. As a result of using more than one liquid crystal sheet, greater range of optical switching capability can be achieved. Also, since the color change upon the application of an electric field can be different for these different sheets, the ability to selectively apply voltage to either one or both of these sheets provides the ability to change the color of the window over a wide range of different colors. As an additional advantage, the use of two sheets permits selective area control over the transmissive properties of the window. For example, one of the sheets can extend over substantially the entire visible surface area of the window, while the second sheet can extend over only a fixed fraction thereof, such fraction being preferably about 20% to 50% of the visible surface area of the window. The effect then is to have dual control, first over the opacity of the total window and second over the opacity of the fractional portion of the window's visible surface area. In this manner, there is achieved a dynamic selective-area tinting, such as typically found in a static case for many automotive front windows. Several different liquid crystal sheets (which can be independently controlled) can be placed on top of one another, so as to eliminate one of the conductive layers which would otherwise be necessary if these sheets where spatially well separated. Alternatively, as shown in FIG. 6, a plurality of liquid crystal cells 14, 14' can be disposed in a spacially separate fashion between panes 6 and 8 to provide a plurality of thermal breaks 10, 10' therebetween.

Flexibility in the change in color during the switching process can be achieved in a variety of different ways depending upon the application mode of the liquid crystals. If a change in opacity is desired without a major change in the spectral distribution of transmitted and/or reflected light, it is useful to employ the change in dynamic scattering of liquid crystals upon the application of an electric field. Alternatively, for those application modes which utilize crossed polarizers, this same objective is readily achieved by means of polarizers which have the same optical density throughout the visible spectral range and by the use of liquid crystal compositions, the birefringence of which is not strongly dependent upon wavelength. Dramatic color changes are obtained upon optical switching by means of several embodiments. A first embodiment comprises use of shutter material composed of cholesteric liquid crystals, the latter materials being typically highly colored. In a second embodiment there is utilized as shutter material a nematic or smectic liquid crystal which has little color, but is used in conjunction with crossed polarizers adapted to absorb nonuniformly in the visible spectral range. Methods of making polarizers which result in conjugated hydrocarbons, such as polyenes, typically produce colored polarizers suitable for this embodiment. By controlling conjugation length of these dichroic molecules, the color at which major absorption occurs can be systematically shifted. In yet another embodiment, the color of the liquid crystal, or window shutter material, is varied in inactivated and activated states by incorporating therein one or more types of dye molecules which have the characteristics mentioned hereinabove.

A gradient in absorption characteristic is often of functional utility, it generally being desired that the uppermost part of the window be most strongly absorbent. Such a gradient can be readily accomplished in a variety of different ways. Generally, for shutters employing liquid crystals in conjunction with polarizers, the polarizing films are constructed by nonuniform chemical, thermal, or mechanical treatments so that there is a gradient in dichroism of the polarizer sheets. Alternatively, a gradient in optical shutter characteristics can be achieved by use of a liquid crystal layer which has a nonuniform thickness, most preferably being wedgelike with the thickest part of the wedge being at the top of the window. As another possibility for obtaining nonuniform optical switching of the liquid crystal sheet, the electric field can be applied nonuniformally over the window area by insulating the electrodes for one part of the window area from those for another.

Generally, in the design of the liquid crystal cells the conductive layers and the electrical connects to the layers are made so that equipotential surfaces result. In such cases, via the use of equipotential connects and the use of materials for the conducting layers which have high volumetric conductivities and large thicknesses, uniform electrical fields can be developed across uniform thicknesses of liquid crystal compositions. For cases where highly conductive layers and equipotential contacts are used, such designs provide that there is no significant voltage drop across the conductive layers, no significant resistive heating in the layers, and uniform switching behavior of the liquid crystal film. However, in certain cases it is desireable that either there is resistive heating within the conductive layers or that these conductive layers are not equipotential surfaces. For example resistive heating within these layers can be used to maintain liquid crystal compositions within the functional temperature range of these compositions and to eliminate window fogging or frost formation. Also, voltage drops due to the finite resistance of the conductive layers can be used to selectively vary the response of the liquid crystals over the optical shutter area. This can be accomplished by applying voltage as a gradient across at least one of the walls of conductive film. More specifically, this can be done by applying a voltage $V_{11}$ to a contact strip at the bottom and a voltage $V_{12}$ to a contact strip at the top of one side of the electrochemical cell and a voltage $V_{21}$ to a contact strip at the bottom and a voltage $V_{22}$ to a contact strip at the top for the reverse side of the liquid crystal cell. As a consequence of this choice of voltage distribution for opposing sides and opposing ends of the walls of the liquid crystal cell, the voltage supplied to the liquid crystal layer varies from $V_{11}-V_{21}$ at the bottom of the cell to $V_{12}-V_{22}$ at the top of the cell. Consequently, a gradient can be achieved across the window surface in the switching characteristics of the liquid crystal cell. The nature of the voltage drop in each conductive surface an be conveniently further modified by varying the thickness of the conductor layer across this surface. The difference in $V_{11}$ and $V_{12}$ provides the resistive heating of the first conductive layer. The difference in $V_{21}$ and $V_{22}$ provides the resistive heating of the second conductive layer. Since $V_{11}$, $V_{12}$, $V_{21}$ and $V_{22}$ are variable independently and since the thicknesses of the associated conductive layers are also variable, as well as the voltage applied on the left hand and the right hand side of the conductive sheets in the liquid crystal cell, one can conveniently vary both the degree of resistive heating in each conductive layer as well as the spatial nature of the voltage applied to the liquid crystal layer. Hence, convenient control of temperature and the areal switching behavior of the liquid crystal sheets are independently achievable.

The polarizer sheets appointed for use in the fabrication of a liquid crystal shutter need not be in close proximity to the liquid crystal sheet. For example, one of the polarizer sheets could be provided with a rolled configuration such as that found in a window shade or a stacked configuration such as that found in slat blinds.

An alternative to the use of liquid crystal shutters that are voltage or current controlled, would comprise utilization of liquid crystal compositions wherein switching is responsive to integrated current flow. For example, liquid crystal phases are employed which become reversibly isotropic as a consequence of reversible electrochemical reactions, such as found in acid-salt chemistry.

A variety of transparent conductors, such as $SnO_2$, $In_2O_3$ and $Cd_2SnO_4$ and the like, can be used as voltage plates for the liquid crystal switch. Examples of commercial compositions for such conductors are transparent metal oxides made by Deposition Technology and Sierracin/Intrex using sputtering techniques involving reactive gases in combination with metal targets. Leybold-Heraeus also offers commercially a metal/metal oxide coating called TCC 2000 which is sufficiently transparent and conductive for the present application.

Having thus described the invention in rather full detail it well be understood that these details need not be strictly adhered to but that further changes and modifications may suggest themselves to one having ordinary skill in the art, all falling within the scope of the invention as defined by the subjoined claims.

We claim:

1. A method for decreasing radiative and conductive heat transfer between the exterior and the interior of a building, comprising the steps of:
   (a) mounting within a window frame a plurality of spaced window panes, a first and a second of said panes having opposing faces;
   (b) affixing to one of the opposing faces a first wall of a liquid crystal cell, said first wall being composed of transparent, electrically conductive film and cooperating with a second wall composed of transparent electrically conductive film to form a cavity containing an electro-optically responsive liquid crystal material providing a selected light transmittance; said film being composed of plastic and said first and second walls having sufficient supporting strength to maintain the integrity of said cell; and
   (c) delimiting between said second wall of said cell and the other of said opposing faces of said panes a space providing a thermal break.

2. A method as recited in claim 1, comprising the step of adjusting said window panes to be substantially parallel.

3. A method as recited in claim 1, comprising the step of sealing said window panes to isolate said space.

4. A method as recited in claim 3, wherein said sealing step includes the step of injecting an inert gas into said space to enhance thermal break characteristics.

5. A method as recited in claim 3 wherein said inert gas is selected from the group consisting of argon, nitrogen, dry air, neon and mixtures thereof.

6. A thermal-pane window unit resistant to radiative heat transfer as well as conductive heat transfer, comprising:
   two substantially parallel, spaced window panes, mounted in a window frame, a first of said panes having affixed thereto a first wall of an electro optical liquid crystal cell providing a selected light transmittance, and a second of said panes delimiting, with a second wall of said cell, a space providing a thermal break, each of said first and second walls comprising an electrically conductive film composed of plastic and having sufficient supporting strength to maintain the integrity of the cell.

7. A thermal-pane window with an electro-optical shade for use in a window space of a building structure, comprising:
   (a) window frame means for securing the mutual orientation of a plurality of transparent, substantially parallel, sequentially spaced panes and for sealingly isolating a space therebetween;
   (b) a first transparent pane mounted in said window frame means in a position toward an exterior facing side of said frame means;
   (c) a second transparent pane, substantially parallel to and spaced from said first pane, mounted in said frame means in a position toward an interior facing side of said frame means;
   (d) a liquid crystal cell comprising a first wall composed of transparent, electrically conductive film, a second wall composed of transparent, electrically conductive film and a liquid crystal material disposed between opposing faces of said first and second walls, said liquid crystal material being electro-optically responsive and said first and second walls having sufficient supporting strength to maintain the integrity of said cells;
   (e) said first wall of said cell being affixed to one of the opposing faces of said first and second panes and said second wall of said cell delimiting with the other opposing face of said first and second panes a space providing a thermal break; and
   (f) electrical means for applying an electric field between said conductive films and through said liquid crystal material of a selected field strength at least sufficient to change the optical transmission of said liquid crystal material.

8. A window unit as recited in claim 6 or 7, wherein said liquid crystal material is electro-optically responsive over a full range of transmittance to a low, voltage field.

9. A window unit as recited in claim 6 or 7, wherein said space has disposed therewithin an inert gas to enhance thermal break characteristics.

10. A window unit as recited in claim 9, wherein said inert gas is selected from the group consisting of argon, nitrogen, dry air, neon and mixtures thereof.

11. A window unit as recited in claim 8, wherein said liquid crystal material is selected from the group consisting of nematic., smectic, cholesteric and mixtures thereof.

12. A window unit as recited in claim 8, wherein said liquid crystal material has intimately mixed therewith monomeric or polymeric dye molecules that are dichroic and have anisotropic shape sufficient to effect preferential orientation thereof.

13. A window unit as recited in claim 8, wherein at least one of said panes is composed of plastic.

14. A window unit as recited in claim 13, wherein said one of said panes includes said liquid crystal composition as a microdispersion inside said plastic.

15. A window unit as recited in claim 14, wherein said plastic is a polymer selected from the group consisting of polymethylmethacrylate and polycarbonates.

16. A window unit as recited in claim 8, wherein said cell has a wedgelike shape.

17. A window unit as recited in claim 8, wherein said liquid crystal material is adapted to change opacity in response to integrated current flow.

18. A window unit as recited in claim 8, wherein said liquid crystal material is adapted to change opacity in response to voltage applied as a gradient across at least one of said walls of conductive film.

19. A window unit as recited in claim 18, wherein said voltage gradient is produced by varying the thickness of said film.

20. A window unit as recited in claim 18, wherein said voltage gradient is produced by varying voltage applied to opposing sides or opposing ends of said walls of said cell.

21. A thermal-pane window unit resistant to radiative heat transfer as well as conductive heat transfer, comprising:
two substantially parallel, spaced window panes, mounted in a window frame, a first of said panes having affixed thereto an electro-optical liquid crystal cell providing a selected light transmittance, and a second of said panes delimiting, with said cell, a space providing a thermal break, said cell comprising a film composed of electrically conductive plastic containing said liquid crystal composition as a micro dispersion inside said plastic, the film having sufficient supporting strength to maintain the integrity of said cell.

* * * * *